March 7, 1933.  R. O. LEWIS  1,900,352

CONDENSER AND METHOD OF MAKING THE SAME

Filed July 13, 1929      2 Sheets-Sheet 1

Inventor
Robert O. Lewis
By George E. Mueller Atty.

March 7, 1933.  R. O. LEWIS  1,900,352
CONDENSER AND METHOD OF MAKING THE SAME
Filed July 13, 1929  2 Sheets-Sheet 2
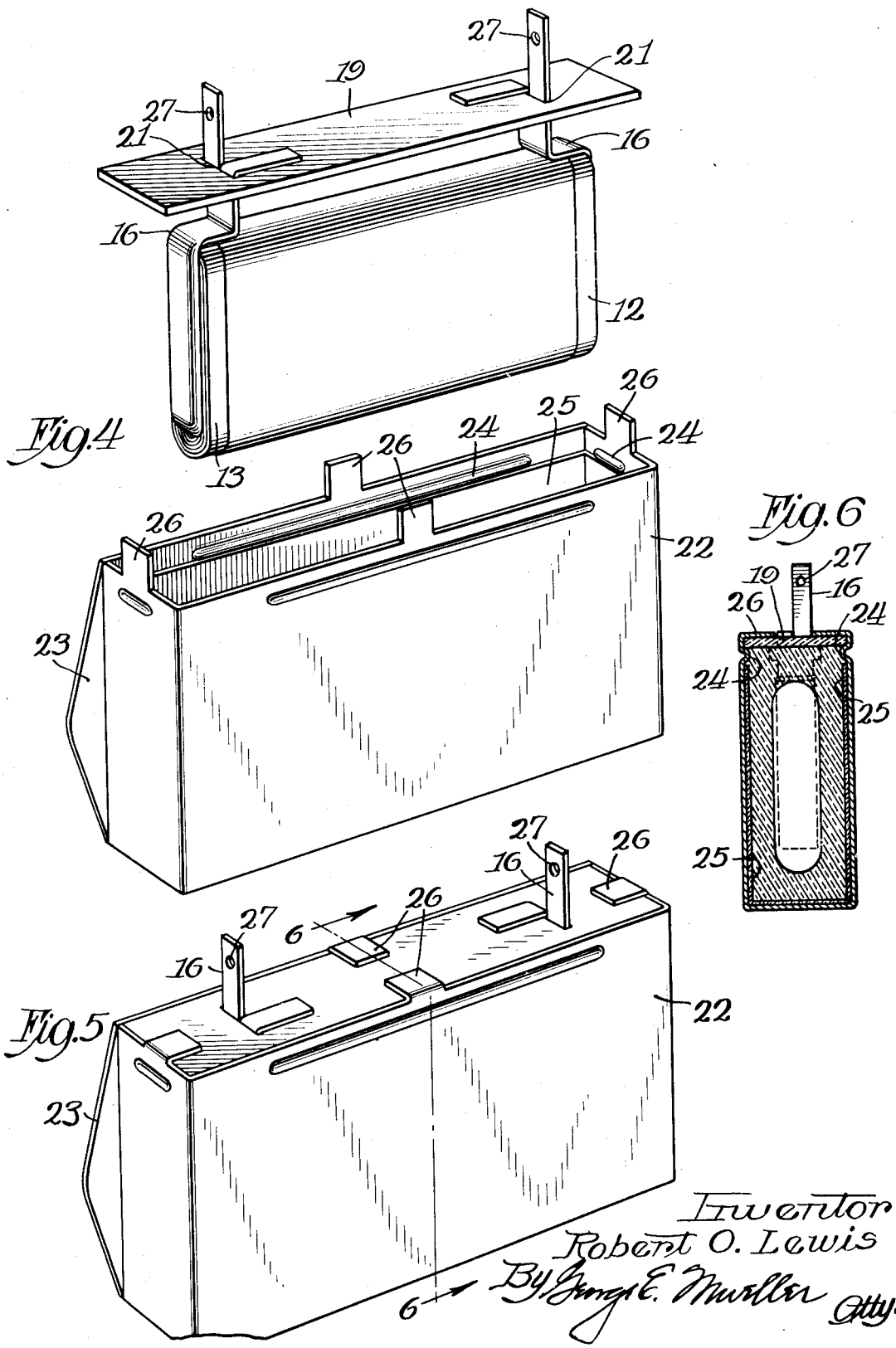

Patented Mar. 7, 1933

1,900,352

UNITED STATES PATENT OFFICE

ROBERT O. LEWIS, OF CHICAGO, ILLINOIS, ASSIGNOR TO GRIGSBY-GRUNOW COMPANY, OF CHICAGO, ILLINOIS, A CORPORATION OF ILLINOIS

CONDENSER AND METHOD OF MAKING THE SAME

Application filed July 13, 1929. Serial No. 378,100.

My invention relates to a condenser and a method of producing a condenser.

In radio systems it has been found advantageous to use non-inductive condensers of the wound ribbon or coil type for high frequencies in which the current flows axially to the plates instead of following the convolutions of the coil as is the case when a terminal member is connected to one point or section of each of the ribbons. In a non-inductive coil condenser each terminal is connected to the end of the coil so as to make conductive contact with the entire edge of the coil plate or ribbon thereby causing the current to flow through the plate in a direction to reduce the induction of the coil.

In securing terminal members to the ends of the coils of non-inductive condensers it is customary to use solder as a bonding material. However, certain difficulties are experienced in the application of the solder due to the fact that if too much solder is used the heat of the solder may damage the coil, and if an insufficient amount of solder is used a poor bond between the terminal and the coil will result.

An object of the invention is to provide an improved condenser and method of making the same.

A further object is to provide an improved mounting for a condenser.

A further object is to provide an effective and efficient method of securing terminals to a condenser coil.

A further object is to provide an improved method of centering a condenser coil in a container.

Other objects and advantages will appear as the description proceeds.

Referring to the drawings:

Fig. 4 is a perspective view showing a condenser and container therefor;

Fig. 5 is a perspective view of a complete condenser, and

Fig. 6 is a section taken on line 6—6 of Fig. 5.

Figure 1:
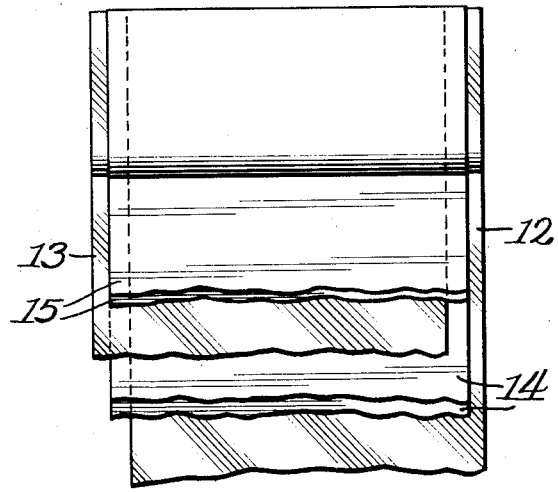
Fig. 1 is a fragmentary elevation showing a coil in the process of being formed.
Figure 3:
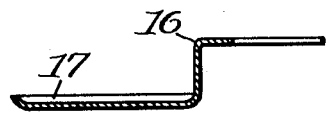
Fig. 3 is a sectional detailed view through the center of a terminal member.
Figure 2:
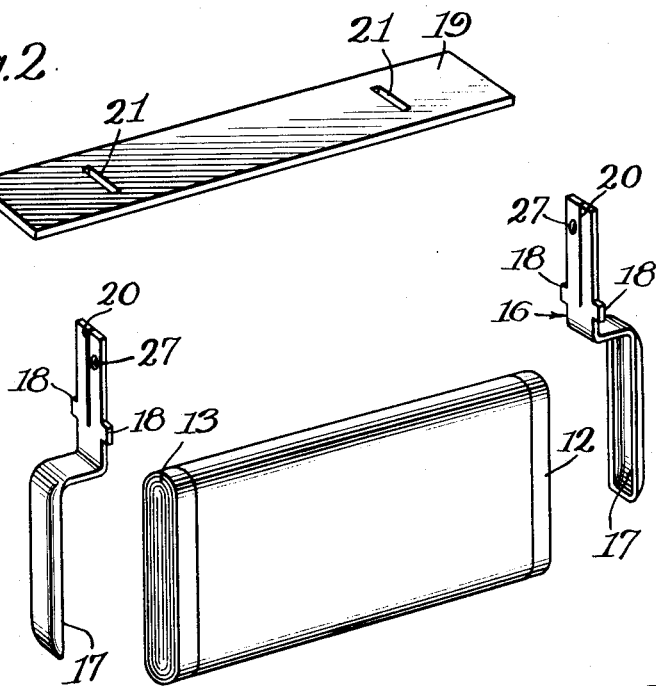
Fig. 2 is a perspective view of the parts used in constructing a condenser.

A non-inductive condenser is wound with the ribbons forming the plates of the condenser laterally offset as shown in Fig. 1 in which the ribbons 12 and 13 represent the plates of the condenser coil. These ribbons are usually made of a conductive material such as tin foil and have a plurality of layers of an insulating ribbon 14—15 wound between the conductive ribbons and forming the dielectric material of the condenser. It will be seen that by laterally offsetting ribbons 12 and 13 the edge of one of the ribbons will project from each end of the coil. Electrically conductive contact may therefore be made with each of the plates of the condenser by securing a terminal member to each end of the coil. Terminal members are usually secured to the ends of the coil by means of solder. It has been found that if too large a quantity of solder is used the heat stored in the solder may damage the condenser coil. On the other hand if too small a quantity of solder is used a poor bond between the terminal and coil may result.

In order to overcome these difficulties a terminal member 16 is provided with an upturned edge or flange 17 forming a dished portion in the terminal member. The dished portion is made of such a size as to hold the proper amount of solder and in securing the terminal member to the coil the dished portion of the terminal is filled with solder and brought into contact with the end of the coil to which it will be securely united when the solder cools. The upper portion of each terminal member is provided with a pair of laterally projecting ears 18 which form a ledge for an insulating strip 19 of cardboard, bakelite or other suitable material. The upper end of the terminal members is provided with a longitudinal slit 20.

In assembling the condenser the insulating strip which is provided with a pair of apertures 21 is placed over the terminals and rests upon the ledge formed by ears 18. One of the divided ends of the terminal members is then bent downwardly against the insulating strip as shown in Fig. 4 to secure the coil terminal members and insulating strip together into a unit.

The condenser coil is preferably housed in a container 22 comprising a rectangular box having tabs 23 by which it may be secured to a base or other member. One end of the container is open and is provided with ledges 24 near the inner upper edge thereof. The interior of the container is usually provided with an insulating envelope 25. In assembling the coil in the container, the container is first partially filled with an insulating material such as black wax. The condenser coil is then inserted in the container and is centered therein by means of the insulating strip 19 being located against the ledge 24 in the container.

In order to secure the insulating strip in position in the container the upper edge of the container is provided with a plurality of tongues 26 which are bent downwardly against the insulating strip as shown in Fig. 5. The portion of the terminal member 16 projecting upwardly from the completed condenser is provided with an aperture 27 to facilitate making electrical connection with the condenser by soldering or otherwise securing an electrical conductor in the aperture.

The embodiment of the invention herein described and illustrated is merely a convenient form of the invention and many modifications may be made therein without departing from the spirit and scope of the invention.

What I claim as new and desire to protect by United States Letters Patent is:

1. A condenser comprising a pair of spaced metallic ribbons wound into a coil, dielectric material between said metallic ribbons, said metallic ribbons being laterally displaced whereby the edge of one ribbon projects from one end of the coil and the opposite edge of the other ribbon projects from the other end of the coil, a strip terminal member for the projecting edge of each metallic ribbon, the portion of the terminal member contacting with the end of the coil being cupped to hold a limited quantity of solder, and the cupped portion being filled with solder for securing the terminal to the coil.

2. A condenser comprising a pair of metallic ribbons wound into a coil, a ribbon of dielectric material for separating the metallic ribbons, the longitudinal axis of said metallic ribbons being laterally displaced whereby the edge of one ribbon projects from one end of the coil and an edge of the other ribbon projects from the other end of the coil, an elongated flat terminal member having a portion provided with an upturned edge to form a shallow cavity, said cavity being filled with solder for securing the terminal member to the edge of one of said metallic ribbons.

3. A method of producing a non-inductive condenser which consists of wrapping a pair of metallic ribbons and dielectric material into a coil in such a manner that one end of each ribbon extends from one end of the coil, forming a strip terminal member to have a shallow dished portion, filling the dished portion of the terminal member with solder, and bringing the terminal member into engagement with an end of said coil to secure it thereto.

4. A method of producing a condenser which consists of wrapping a pair of metallic ribbons into a coil in such a manner that an edge of each ribbon projects from an end of the coil, providing an elongated flat terminal member having a cupped portion, filling the cupped portion with such a quantity of molten solder so as to prevent undue heating of the coil, forcing the terminal member against an end of the coil and allowing the solder to cool to secure the terminal member to the coil.

5. A condenser comprising a coil of metallic ribbons separated by a dielectric material, a terminal member at each end of said coil having laterally extending ears, a container for the condenser, an insulating strip forming a closure for said container, said insulating strip being provided with apertures for the terminal members and resting on said ears, a portion of said terminal members being formed to secure the insulating strip against said ears.

6. A condenser comprising a coil of metallic ribbons and a dielectric material, terminal members for said coil projecting from the coil, each terminal member having a slit in its projecting end dividing the end into two parts, a container for the condenser, an insulating strip provided with an aperture for each terminal member and forming a closure for the container, one of the divided ends of each terminal member being bent over the insulating strip to form a unit of the coil and strip.

7. A condenser comprising a coil of metallic ribbons and a dielectric material, terminal members for said coil projecting therefrom, a lateral projection on the terminal members forming a ledge, the terminal members having a longitudinal slit above the ledge, a container for the condenser coil, an insulating strip having apertures through which the terminal members project, the strip resting upon the ledge formed on the terminal members and a portion of the slitted end of the terminal member being bent downwardly to retain said strip upon the ledge forming a unit of the strip and condenser coil.

8. A method of producing a condenser which consists of wrapping a pair of metallic ribbons and a dielectric material to form a coil, forming terminal members having a dished portion at one end, providing the opposite end of the terminal members with a slit, filling the dished portions of the terminals with molten solder, securing a terminal member to each end of the coil, placing an insulating strip having apertures therein for the terminal members over the terminal member, and bending a portion of the slitted end of each terminal member against the insulating strip to form a unit of said strip and the coil.

9. A method of producing a condenser which consists of forming a condenser coil wherein each end of the coil consists of the edge of a coiled plate, forming a dished terminal member having a divided end, placing solder in the dished portion and securing it to an end of the coil, placing an insulating member over the divided end of the terminal and bending a portion of the divided end over the insulating member to secure it to the terminal.

10. A method of producing a condenser which consists of forming a condenser coil wherein each end of the coil consists of an edge of a coiled plate, securing terminal members one to each end of said coil, dividing the opposite end of said terminal members, placing an insulating strip over said terminal members, bending one of the divided ends of each terminal member against said strip to secure the strip to the terminal members, providing a container for said coil, providing a bead adjacent the open side of the container, centering the coil in the container by resting the insulating strip upon said bead, and crimping a portion of said container against said strip to form a unitary structure.

11. A condenser comprising a condenser coil, terminals secured to the ends thereof, an insulating strip secured to the terminals, a container having an open side, a bead adjacent the inner open edge of the container, a plurality of projections along the edge of the open side of said container, said insulating strip forming a closure for the container and secured thereto by said projections.

12. A condenser comprising a coil of metallic ribbons and a dielectric material, terminal members for said coil projecting therefrom, lateral projections on the terminal members forming a ledge, the terminal members having longitudinal slitted ends above the ledge, a container for the condenser coil, an insulating strip having apertures through which the terminal members project, said strip resting upon the ledge formed on the terminal members, diagonally opposite portions of said slitted ends of the terminal members being bent downwardly to retain said strip upon the ledge forming a unit of the strip condenser coil and terminals.

In witness whereof, I hereunto subscribe my name this 19th day of June, 1929.

ROBERT O. LEWIS.